UNITED STATES PATENT OFFICE.

WILLIAM MARTIN, OF CHICAGO, ILLINOIS.

COMPOUND FOR DISINFECTING PURPOSES.

SPECIFICATION forming part of Letters Patent No. 690,867, dated January 7, 1902.

Application filed March 25, 1901. Serial No. 52,762. (No specimens.)

*To all whom it may concern:*

Be it known that I, WILLIAM MARTIN, a citizen of the United States, residing at Chicago, Illinois, have invented certain new and useful Improvements in Compounds for Disinfecting Purposes, of which the following is a specification.

The object of my invention is to provide a simple, economical, and efficient compound to be used for the purpose of disinfecting and destroying the germ life existing especially in noxious gases arising from sewer-vaults, &c.; and my invention consists in the combination hereinafter described and claimed.

In making my compound I take two-thirds of sulfur and one-third of black oxid of manganese and thoroughly mix the same. The compound may then be put up in packages for shipment or storage, as desired.

In using my compound I take a small quantity, place it in a shallow vessel, and heat it to a heat of almost 300° Fahrenheit, when it will evolve a disinfecting-gas particularly destructive to germ life. If it be desired to disinfect a sewer-vault, the vessel containing the heated compound should be lowered a short distance into the vault, when the disinfecting-gases will mingle with the sewer-gases as they arise, effectually killing all germ life therein contained. Some of the disinfecting-gas will fall and penetrate the sewage a short distance, killing any germ life it comes in contact with.

I claim—

The herein-described compound for disinfecting, composed of a mixture of sulfur and black oxid of manganese, substantially as described.

WILLIAM MARTIN.

Witnesses:
   THOMAS F. SHERIDAN,
   HARRY IRWIN CROMER.